United States Patent [19]

Jensen et al.

[11] Patent Number: 4,759,811

[45] Date of Patent: Jul. 26, 1988

[54] METHOD FOR REPAIR OR ACCESSING PRESSURIZED CABLE

[75] Inventors: Michael L. Jensen, Mountain View, Calif.; Jean M. E. Nolf, Hamme-Mille, Belgium

[73] Assignee: Raychem Corporation, Menlo Park, Calif.

[21] Appl. No.: 625,577

[22] Filed: Jun. 28, 1984

Related U.S. Application Data

[63] Continuation of Ser. No. 341,359, Jan. 21, 1982, abandoned, which is a continuation-in-part of Ser. No. 231,000, Feb. 4, 1981, abandoned.

[51] Int. Cl.⁴ .................... B29C 67/10; B29C 65/66
[52] U.S. Cl. ............................... 156/86; 156/87;
156/286; 174/12 R; 174/16 R; 174/135;
264/36; 264/104; 264/230; 425/802; 425/812
[58] Field of Search ............ 264/36, 230, 104;
156/48, 49, 86, 87, 286; 425/812, 802; 174/12
R, 16 R, 135, DIG. 8

[56] References Cited

U.S. PATENT DOCUMENTS

| | | | |
|---|---|---|---|
| 2,859,270 | 11/1958 | Patchin | 174/16 |
| 3,188,121 | 6/1965 | Cude et al. | 285/197 |
| 3,235,651 | 2/1966 | Tepner | 174/21 |
| 3,455,336 | 7/1969 | Ellis | 138/156 |
| 3,564,119 | 2/1971 | Thompson | 174/135 |
| 4,035,534 | 7/1977 | Nyberg | 428/36 |
| 4,107,454 | 8/1978 | Jakobsen | 174/135 |
| 4,142,592 | 3/1979 | Brusselmans | 174/92 |
| 4,163,117 | 7/1979 | Campbell et al. | 174/74 A |
| 4,177,376 | 12/1979 | Horsma et al. | 219/553 |
| 4,236,949 | 12/1980 | Horsma et al. | 156/49 |
| 4,289,553 | 9/1981 | Nolf | 156/86 |
| 4,298,415 | 11/1981 | Wolf | 264/230 X |

FOREIGN PATENT DOCUMENTS

| | | |
|---|---|---|
| 2317564 | 2/1977 | France . |
| 536798 | 6/1973 | Switzerland . |
| 1562086 | 3/1980 | United Kingdom . |

*Primary Examiner*—Jeffery Thurlow
*Attorney, Agent, or Firm*—Herbert G. Burkard

[57] ABSTRACT

A unique air vent is provided for use with heat-recoverable closures when installed on pressurized cables. Typically, when a heat-recoverable closure is used to repair a hole or opening in the jacket of a pressurized cable the cable must be depressurized during installation of the closure to ensure formation of a pressure and watertight seal. The air vent assembly permits installation of a heat-recoverable closure without the need for depressurizing the cable. After installation, the air vent can be used as an access point to the pressurized air within the cable.

8 Claims, 2 Drawing Sheets

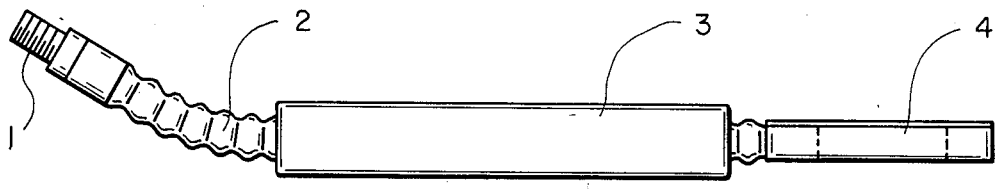
FIG_1
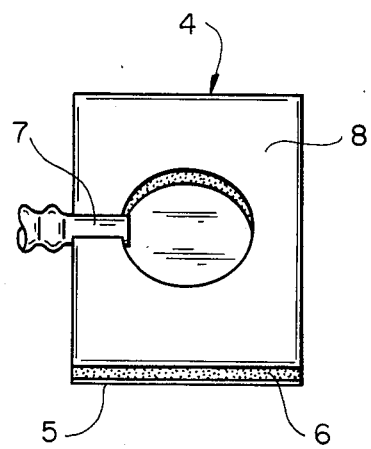
FIG_2
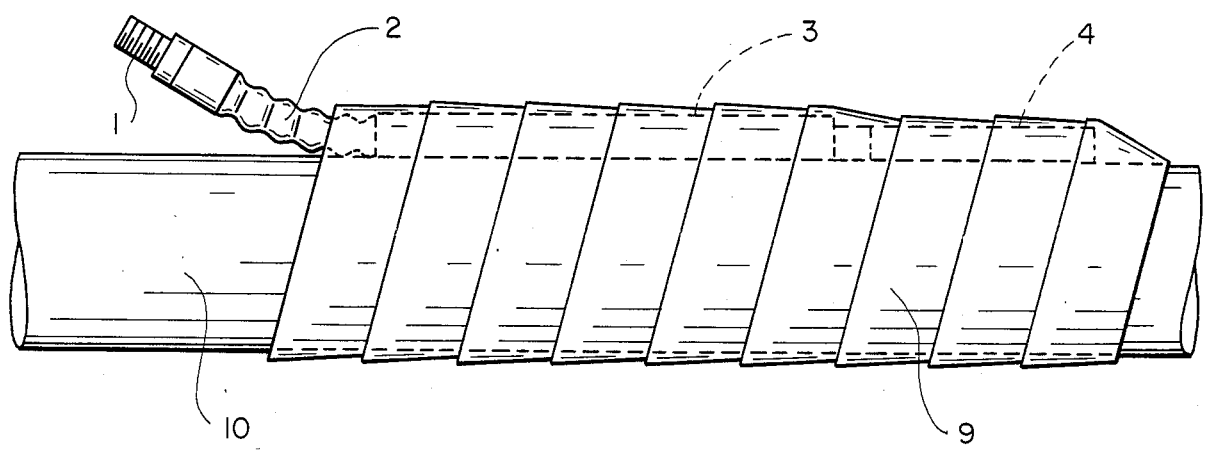
FIG_3

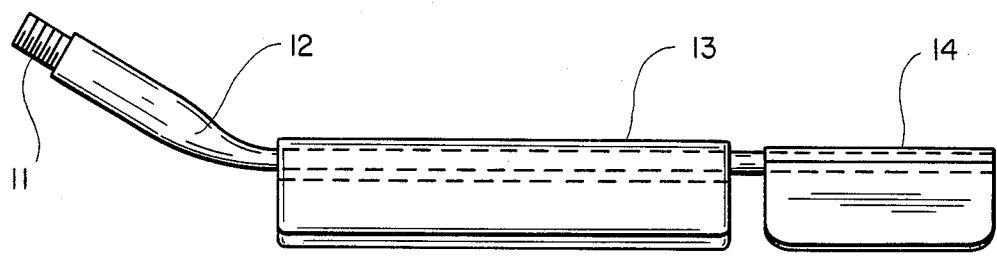
FIG_4
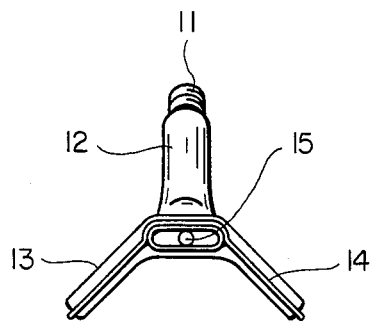
FIG_5
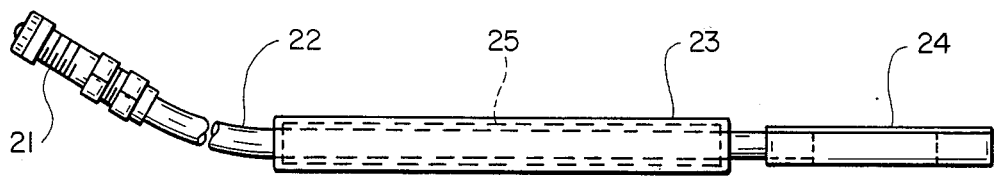
FIG_6

4,759,811

METHOD FOR REPAIR OR ACCESSING PRESSURIZED CABLE

This application is a continuation of U.S. Ser. No. 341,359 filed Jan. 21, 1982, now abandoned, which is a continuation-in-part of U.S. Ser. No. 231,000 filed Feb. 4, 1981, also abandoned.

BACKGROUND OF THE INVENTION

This invention relates to an air vent assembly for use in conjunction with heat-recoverable closures when used to seal, repair and/or protect pressurized cables. The air vent assembly, in conjunction with a heat-recoverable closure, can also be used to provide access to pressurized air in the cable.

Heat-recoverable closures, such as, tubular sleeves, wraparound sleeves and tape are used to form a protective covering around elongate substrates such as cables, including pressurized and non-pressurized telephone cables. The heat-recoverable sleeve or tape is generally coated with a layer of mastic or an adhesive, preferably a hot melt adhesive. Alternatively the adhesive may be applied in the form of a tape, sheet or sleeve positioned around the cable, or other substrate before placing the heat-recoverable closure around the substrate. Heating of the closure causes the closure to recover and the adhesive to melt and flow. Upon cooling, a pressure and watertight seal results. It has been found that when such a protective system is used with pressurized cables, pressurized air escaping from the cable forces its way through the molten adhesive, resulting in leakage pathways and inadequate sealing between the heat-recovered sleeve or tape and the cable. To avoid this result, it is often necessary or desirable to depressurize the cable prior to and during the heat-recovery step. To avoid depressurizing the cable, a pressure access flange is sometimes used. However, this requires making a hole or slit in the heat-recoverable closure to accomodate the outlet of the pressure access flange. This hole in the closure can cause splitting along the length of the closure during the heat-recovery step.

SUMMARY OF THE INVENTION

This invention provides a means for forming a pressure and watertight seal between a pressurized cable and a heat-recoverable closure without the need for making a hole in the closure or for depressurization of the cable. One aspect of this invention comprises an air vent assembly comprising:
 (a) a tubular fitting;
 (b) an elongate semi-flexible, non-collapsible hollow tube, one end of which is connected to said fitting; and
 (c) deflection means, secured at the other end of said hollow tube, for deflecting pressurized air into the tube while preventing ingress of viscous material.

Another aspect of this invention comprises a method of protecting a pressurized cable having an outer protective jacket, which jacket has an opening therein permitting air to escape from the cable, which comprises:
 (a) placing an air vent assembly against the cable, said air vent assembly comprising:
   (i) a tubular fitting;
   (ii) an elongate, semi-flexible, non-collapsible hollow tube, one end of which is connected to said fitting; and
   (iii) a deflection means secured at the other end of said hollow tube;
 said assembly being positioned so that the end of the hollow tube remote from the air is placed against said opening in said jacket such that pressurized air is deflected by said deflection means into said tube;
 (b) positioning a heat-recoverable closure over said cable and vent assembly such that the fitting extends beyond the closure;
 (c) heating the closure to cause it to recover into intimate contact with the cable and vent assembly.

Yet another aspect of this invention comprises:
 (a) forming a hole in the outer cable jacket of said pressurized cable;
 (b) placing an air vent assembly against the cable, said vent assembly comprising:
   (i) a tubular fitting;
   (ii) an elongate, semi-flexible, non-collapsible hollow tube, one end of which is connected to said fitting; and
   (iii) a deflection means secured at the other end of said hollow tube;
 said assembly being positioned so that the end of the hollow tube remote from the air is placed against said opening in said jacket such that pressurized air is deflected by said deflection means into said tube;
 (c) positioning a heat-recoverable closure over said cable and vent assembly such that the fitting extends beyond the closure;
 (d) heating the closure to cause it to recover into intimate contact with the cable and vent assembly.

BRIEF DESCRIPTION OF THE DRAWINGS

FIG. 1 illustrates a typical vent assembly of this invention wherein the hollow tube is a metal spring encompassed by a polymeric sheath.

FIG. 2 illustrates the deflection means of the vent assembly of FIG. 1.

FIG. 3 demonstrates the use of a vent assembly of this invention for the repair of a pressurized cable using a heat-shrinkable tape spirally wrapped around the pressurized cable.

FIG. 4 illustrates a typical vent assembly of this invention wherein the hollow tube is a flattened metal tube.

FIG. 5 illustrates an end view of the vent assembly similar to that of FIG. 4 with a shape retention means within the hollow tube.

FIG. 6 illustrates a typical vent assembly of this invention wherein the hollow tube is of nylon.

DETAILED DESCRIPTION OF THE INVENTION

The air vent assembly is used in conjunction with a heat-recoverable closure used to enclose a pressurized cable. The heat-recoverable closure can be a heat-shrinkable tubular sleeve, wraparound sleeve or tape which can be spirally wound around a cable. Such heat-recoverable closures are well known in the art. Descriptions of such closures can be found, for example in U.S. Pat. Nos. 3,455,336, 4,035,534, 4,142,592, 4,163,117, and 4,177,376 and U.K. Pat. No. 1,562,086, the disclosures of which are incorporated herein by reference. The inner surface of the closure is generally coated with a layer of a mastic or an adhesive, preferably a hot melt adhesive, to provide a pressure and watertight seal between the cable and the closure. The heat-recoverable closure can be used to protect, repair and seal an opening in the cable outer protective jacket. The hole or opening, can be the result of damage to the cable, a gap between the jacket cable and a splice case, or any other source of leakage of air from the cable.

The vent assembly of this invention can also be used to provide access to the pressurized air in the cable. In this case a hole is deliberately made in the outer jacket of the cable for installation of the air vent. The heat-recoverable closure provides a protective seal around the vent assembly. The vent assembly can be installed at any point along the pressurized cable and can be used as an outlet for measuring pressure at that point. The air vent can also be used to provide access to the pressurized air of the cable for use as a source of pressurized air. For example, a tube can be connected to the fitting of the vent assembly and to the air inlet valve of an apparatus case for pressurizing the apparatus case.

The air vent assembly can also be used with unpressurized cables to provide for flash testing of the installed heat-recovered closure to establish that an environmental seal has been formed.

The air vent assembly is installed by placing the assembly on the cable with the elongate hollow tube extending along the length of the cable. The open end of the hollow tube is placed next to the hole or opening in the cable jacket with the deflection means being positioned around the opening to direct the air flow from the cable opening into the tube. The deflection means also functions to prevent other material, in particular viscous material such as molten adhesive, from flowing into the tube. The heat-recoverable closure is then placed over the cable and vent assembly leaving the fitting extending so that it remains accessible. The heat-recoverable closure is then heated causing it to shrink down into intimate contact with the cable and air vent. During the heat-recovery step, the adhesive of the heat-recoverable closure melts and flows. The deflection means is positioned to prevent the viscous molten adhesive from flowing into the hollow tube. The deflection means thus serves a dual function, i.e. deflecting air from the opening in the cable to the tube while preventing the flow of molten adhesive into the tube.

At one end of the air vent assembly is a tubular fitting. The tubular fitting is of a solid material, preferably metal. The fitting can be adapted to receive a cap or connector, such as a tube or tube and valve combination to conduct air from the cable. Preferably the end portion of the fitting has a threaded outer surface for this purpose. The internal surface of the fitting preferably also is threaded to accommodate a valve core. A valve core can be placed within the fitting immediately after installation, if desired. Generally, a valve core will be added if the air vent is to remain unconnected to another piece of equipment, such as an apparatus case as mentioned above. The valve core prevents pressurized air from escaping through the air vent and can be used to test the pressure in the system. After the valve core has been installed, a cap can be attached to the fitting to protect the fitting and valve from corrosion and/or mechanical damage.

An elongate, semi-flexible non-collapsible hollow tube is attached to one end of the tubular fitting. The hollow tube allows air to flow from an opening in the pressurized cable when a heat-recoverable closure is being installed. The tube must be sufficiently non-collapsible so that it is capable of withstanding the forces and temperatures developed during the heat-recovery step. The tube can be of metal, plastic, or reinforced plastic. The tube should be sufficiently flexible to conform to the shape of the cable. If the tube is of metal, it should be a relatively thin-walled tube or of a tube of convoluted shape.

In a preferred embodiment of the invention, the tube is of a relatively high melting plastic such as nylon, polyethylene terephthalate, polytetrafluoroethylene, or the like.

In another preferred embodiment, the tube comprises a metal spring encompassed by a polymeric sheath. Such a tube can readily be formed by placing a heat-recoverable sleeve over the metal spring, then heating to cause the sleeve to shrink to encompass the spring. The spring can be circular, or can be flattened into an eliptical shape, if desired. Preferably the spring is attached to the end of the fitting before the sleeve is applied. The heat-recoverable sleeve is positioned so that it covers the end of the fitting as well as the rest of the spring. A watertight seal is formed between the sleeve and the fitting by applying a strip of hot melt adhesive to the fitting or by use of a heat-recoverable sleeve coated on the inside thereof with hot melt adhesive. It has been found advantageous to add grooves to the outside of the fitting to accommodate the hot melt adhesive and assure a watertight seal.

As discussed above, the air vent assembly of this invention is used in conjunction with a heat-recoverable closure. Such heat-recoverable closures are generally coated on the inside with a layer of mastic or adhesive, preferably a hot melt adhesive. To assure that a pressure and watertight seal is formed between the heat-recoverable closure, the air vent assembly and the cable, it has been found to be advantageous to use additional hot melt adhesive. The additional adhesive is preferably added along the length of the elongate hollow tube of the air vent. The adhesive can be molded around the hollow tube or placed around the hollow tube in the form of a sheet or sleeve. When heat is applied to recover the heat-recoverable closure, this additional hot melt adhesive will melt and flow to fill completely the space between the cable and closure. Adequate heating of the hot melt adhesive under the tube is facilitated if the adhesive is rendered thermally conductive. This can be accomplished by adding metal flakes or wires to the adhesive. A preferred method is to form a laminate of two layers of hot melt adhesive with an intermediate layer of a metal mesh, screen or foil.

It has been found that the adhesive used around the air vent should have certain desired flow characteristics, depending on the ultimate system with which it is used. For use with a pressurized telecommunication cable the adhesive should be adequate to form a seal around the air vent and maintain that seal over fluctuating environmental temperatures. Typically, the adhesive should maintain a seal at temperatures from $-40°$ C. to $+60°$ C.

The deflection means is attached to the end of the hollow tube of the air vent assembly. The deflection means is shaped such that when the end of the hollow tube is placed adjacent an opening in the cable jacket, the deflection means makes contact with the jacket surrounding the opening. A layer of pressure sensitive adhesive on the inner surface of the deflection means holds it in place during installation of the air vent assembly and heat-recoverable closure. The deflection means preferably is sufficiently flexible to be molded to conform to the shape of the cable. In a preferred embodiment, the deflection means comprises a layer of flexible polymeric foam, for example, a foam of ethylene-propylene-diene rubber, neoprene, silicone rubber or the like, and a layer of a solid material to provide structural integrity for the foam. This layer can be of, for example, a polymer such as polypropylene, a laminate of paper or aluminum and polyethylene terephthalate, and the like.

The invention is further illustrated in the accompanying drawings. FIG. 1 shows a typical valve assembly of this invention. In FIG. 1, a brass fitting, 1, is connected to a hollow tube, 2. The tube is produced by threading a metal spring (not shown directly in the drawings) onto the end portion of the fitting and then installing a polymeric sheath over the spring. The polymeric sheath is applied in this case by positioning a heat-shrinkable sleeve over the fitting and then heating to shrink the tube down onto the outer surface of the spring forming the convoluted tube, 2, shown in FIG. 1. In this case, the heat-shrinkable sleeve used is of cross-linked polyethylene and the inner surface thereof was coated with a hot melt adhesive to provide a watertight seal between the sleeve and the fitting. As mentioned above, a strip of hot melt adhesive applied to the fitting can be used to achieve this result. The hollow tube, 2, is provided with a layer of hot melt adhesive, 3. This layer of hot melt adhesive preferably extends along the length of the hollow tube. The hot melt adhesive is of the same type known in the art for use in installing heat-recoverable closures. For example, a description of suitable hot melt adhesives can be found in U.S. Pat. No. 4,018,733 of Lopez et al. A layer of mastic or other adhesive can be used in place of the hot melt adhesive, although hot melt adhesive is preferred. It is also possible to add a layer of hot melt to the hollow tube, 2, of the vent assembly after it has been positioned against the cable but prior to application of the heat-recoverable closure. A deflection means, 4, is attached to the open end of the hollow tube, 2.

In FIG. 2, the deflection means of the vent assembly of FIG. 1 is illustrated in greater detail. FIG. 2 shows the laminate structure of the deflection means. An outer layer, 5, of relatively rigid material extends completely across the deflection means. In this particular embodiment, this layer, 5, is of polypropylene. A foam layer, 6, adheres to the outer layer, 5. The foam layer is cut out in a shape to accommodate the open end of the hollow tube, 7, and to deflect air from an opening in the cable over which it is placed into the hollow tube. The inner surface, 8, of the foam is coated with a pressure sensitive adhesive to be applied to the cable surface surrounding the opening.

FIG. 3 illustrates the use of the vent assembly of FIG. 1. In FIG. 3, the fitting, 1, of the vent assembly and a portion of the hollow tube, 2, extend from a heat-recoverable tape, 9, which is spirally wrapped around a pressurized cable, 10. The heat-recoverable tape used in this particular embodiment is an electrically self-heating heat-shrinkable tape commercially available from Raychem Corporation as "AutoWrap TM". The adhesive layer, 3, and deflection means, 4, are shown by dotted lines as they are positioned between the cable, 10, and heat-recoverable closure, 9. The deflection means, 4, is positioned over an opening in the cable, 10, so that air from the cable flows into the hollow tube, 2, of the air vent. A valve core can be placed within the fitting, 1, and a protective cap placed over the fitting, if desired.

FIGS. 4 and 5 show another typical air vent assembly of this invention. In this embodiment, a fitting, 11, is connected to a hollow metal tube, 12. The metal tube is flattened along a portion thereof so that it will lie flat when positioned against a cable. A sheet of hot melt adhesive, 13, is provided around the flattened portion of the hollow tube. A deflection means, 14, is provided at the end of the hollow tube. In this embodiment, the deflection means, 14, is a metal shield bent to accommodate the hollow tube, 12, and a cable. That portion of the hollow tube which extends beyond the adhesive is coated with a protective coating. In the embodiment shown, this part of the hollow tube is covered with a polymeric sheath, applied in the form of a tubular heat-shrinkable polymer sleeve heated to shrink into intimate contact with the tube and preferably coated on the inside with a hot melt adhesive so that a watertight seal is created. FIG. 5 is an end view of the assembly of FIG. 4 showing shape retention means, 15, positioned with the flattened portion of the hollow tube, 12. The shape retention means, 15, is a metal rod which extends the length of the flattened portion of the tube, preventing its collapse if it is bent longitudinally to conform to the cable.

FIG. 6 shows another preferred embodiment of this invention. In FIG. 6, the air vent comprises hollow tube, 22, of nylon, deflection means, 24, and fitting, 21. A strip of hot melt adhesive, 23, containing a metal mesh, 25, is placed around that portion of the hollow tube which will be positioned within a heat-recoverable closure. The hot melt adhesive used in this embodiment is an ethylene-vinyl acetate based polymer which has been subjected to irradiation at a dose of about 1 megarad. The air vent assembly can be used on a pressurized cable adjacent an apparatus case. The hollow tube is sufficiently long to enable it to be connected to the apparatus case to conduct air under pressure from the cable into the apparatus case (not shown).

The present invention has been set forth in the form of several preferred embodiments. It is nevertheless understood that modifications may be made by those skilled in the art without departing from the spirit and scope of the present invention. Moreover, such modifications are considered to be within the purview of the appended claims.

What is claimed is:

1. A method of protecting a pressurized cable having an outer protective jacket which jacket has an opening therein which permits air to escape from the cable which comprises:
    (a) placing an air vent assembly against the cable, said air vent assembly comprising:
        (i) a tubular fitting;
        (ii) an elongate, semi-flexible, non-collapsible hollow tube, one end of which is connected to said fitting; and
        (iii) deflection means secured at the other end of said hollow tube;
        said assembly being positioned so that the end of the hollow tube remote from the fitting is placed against said opening in said jacket;
    (b) positioning said deflection means to prevent the flow of viscous material into said tube and to deflect air from said opening into said tube;
    (c) positioning a heat-recoverable closure over said cable and vent assembly such that the fitting extends beyond the closure; and (d) heating the closure to cause it to recover into intimate contact with the cable and vent assembly.

2. The method of claim 1, wherein said heat-recoverable closure is a wraparound heat-shrinkable polymeric sleeve.

3. The method of claim 1, wherein said heat-recoverable closure is a heat-shrinkable tape spirally wrapped around the cable.

4. The method of claim 3, wherein said heat-shrinkable tape is a self-heating electrical tape provided with means for connection to a source of electrical power.

5. The method of claim 1, wherein said heat-recoverable closure is a tubular heat-shrinkable polymeric sleeve.

6. The method of claim 1, which further includes the step of positioning a valve within said fitting after heat-recovery of said closure.

7. A method for providing access to pressurized air within a pressurized cable, said cable having an outer jacket which prevents air from escaping from said cable, which method comprises:
(a) forming a hole in the outer cable jacket of said pressurized cable;
(b) placing an air vent assembly against the cable, said air vent assembly comprising:
  (i) a tubular fitting;
  (ii) an elongate, semi-flexible, non-collapsible hollow tube, one end of which is connected to said fitting; and
  (iii) deflection means secured at the other end of said hollow tube;
said assembly being positioned so that the end of the hollow tube remote from the fitting is placed against said opening in said jacket;
(b) positioning said deflection means to prevent the flow of viscous material into said tube and to deflect air flow from said opening into said tube;
(c) positioning a heat-recoverable closure over said cable and vent assembly such that the fitting extends beyond the closure; and
(d) heating the closure to cause it to recover into intimate contact with the cable and vent assembly.

8. A method of enclosing an electric cable which comprises:
(a) placing an air vent assembly against the cable, said air vent assembly comprising:
  (i) a tubular fitting;
  (ii) an elongate, semi-flexible, non-collapsible hollow tube, one end of which is connected to said fitting; and
  (iii) deflection means secured at the other end of said hollow tube;
(b) positioning said deflection means against said cable to prevent ingress of viscous material into said hollow tube;
(c) positioning a heat-recoverable closure over said cable and vent assembly such that the fitting extends beyond the closure; and
(d) heating the closure to cause it to recover into intimate contact with the cable and vent assembly.

* * * * *